(12) United States Patent
Johnson

(10) Patent No.: US 6,597,843 B2
(45) Date of Patent: Jul. 22, 2003

(54) FIBER PIVOT FOR OPTICAL ALIGNMENT

(75) Inventor: Glen Walden Johnson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 09/902,418

(22) Filed: Jul. 10, 2001

(65) Prior Publication Data

US 2003/0012522 A1 Jan. 16, 2003

(51) Int. Cl.[7] .............................. G02B 6/26; G02B 6/30; G02B 6/36
(52) U.S. Cl. .............................. 385/52; 359/49; 359/92
(58) Field of Search .............................. 385/32, 49, 88, 385/89, 90, 91, 92, 97, 98, 137, 52

(56) References Cited

U.S. PATENT DOCUMENTS

| | | | | |
|---|---|---|---|---|
| 5,386,488 A | * | 1/1995 | Oikawa | 385/92 |
| 5,457,765 A | * | 10/1995 | Suzuki et al. | 385/137 |
| 5,671,315 A | * | 9/1997 | Tabuchi et al. | 385/137 |
| 5,857,049 A | * | 1/1999 | Beranek et al. | 385/91 |
| 5,859,942 A | * | 1/1999 | Ueda | 385/49 |
| 5,896,481 A | * | 4/1999 | Beranek et al. | 385/90 |
| 6,052,178 A | * | 4/2000 | Hirano | 356/73.1 |
| 6,256,437 B1 | * | 7/2001 | Sakushima et al. | 385/49 |
| 6,263,137 B1 | * | 7/2001 | Yoneyama et al. | 385/49 |
| 6,270,261 B1 | * | 8/2001 | Kawano | 385/88 |
| 6,282,350 B1 | * | 8/2001 | Takahashi et al. | 385/88 |
| 6,282,351 B1 | * | 8/2001 | Go et al. | 385/92 |
| 2001/0024549 A1 | * | 9/2001 | Takahashi et al. | 385/49 |

* cited by examiner

Primary Examiner—Evelyn Lester
Assistant Examiner—Jack Dinh
(74) Attorney, Agent, or Firm—F. Chau & Associates, LLP

(57) ABSTRACT

The present disclose provides methods and systems for positioning a fiber end of an optical fiber. A block is provided having an opening for receiving the optical fiber. The optical fiber is positioned in the opening to constrain the optical fiber in at least one direction. The optical fiber has a first portion with a free end which is cantilevered or extends from the block. The optical fiber is moved against the at least one direction which is constrained. The movement is provided from a position on a second portion of the optical fiber, which is opposite the first portion relative to the block. This movement causes a lateral displacement of the free end.

32 Claims, 12 Drawing Sheets

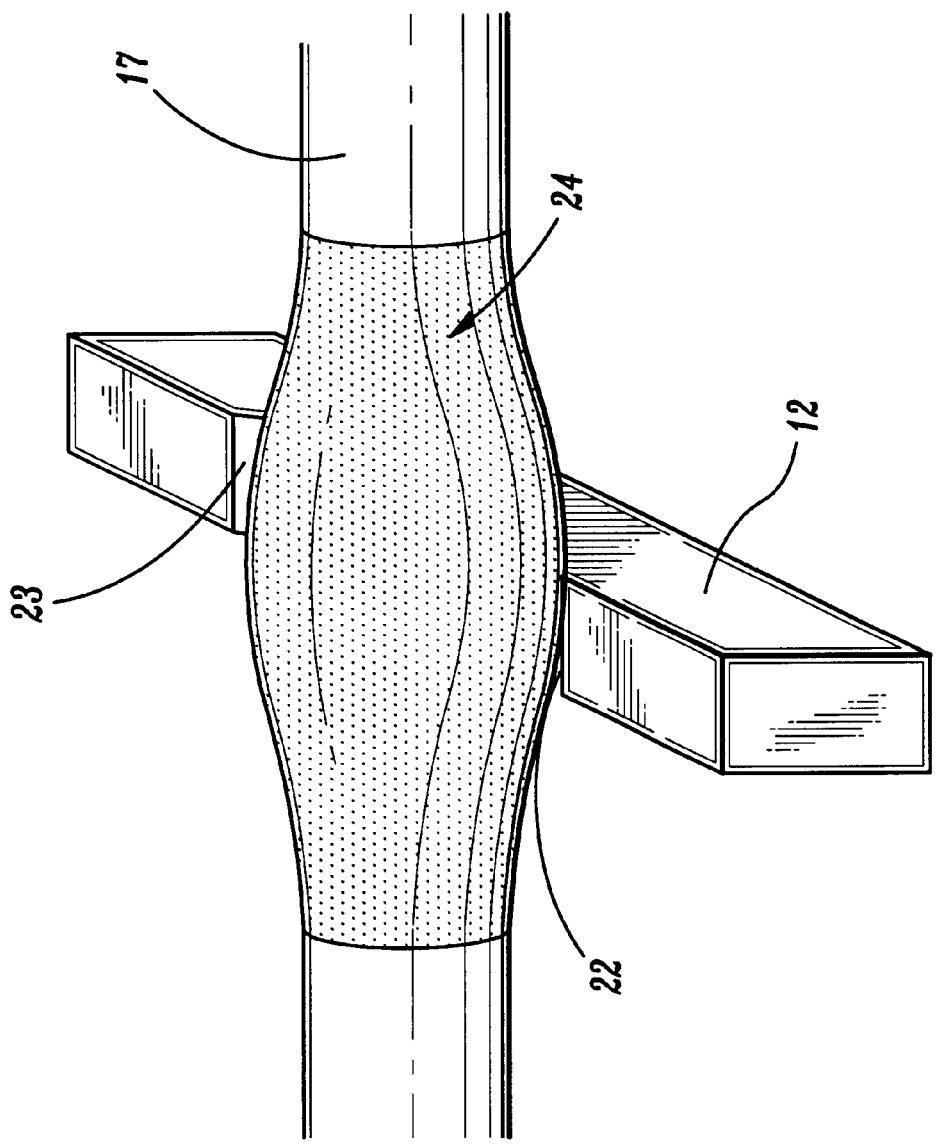

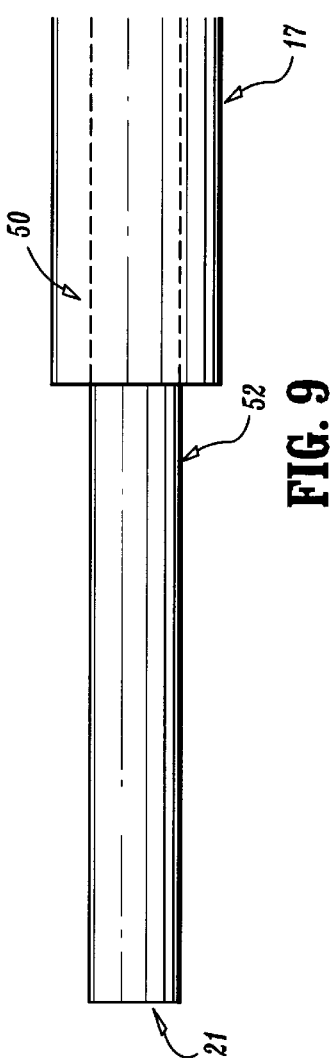
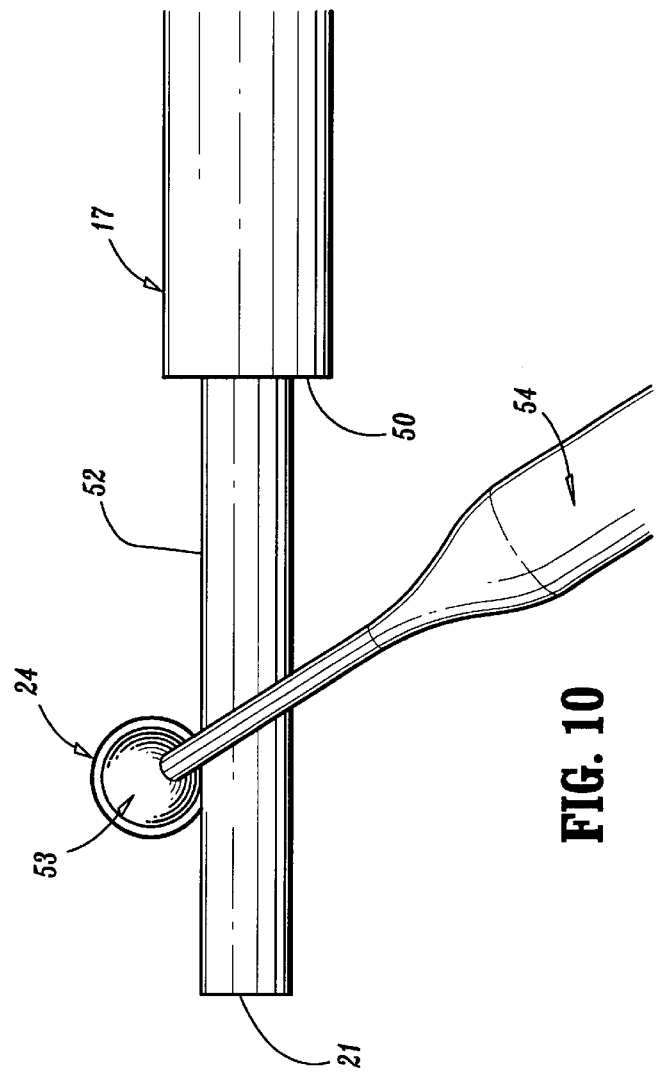

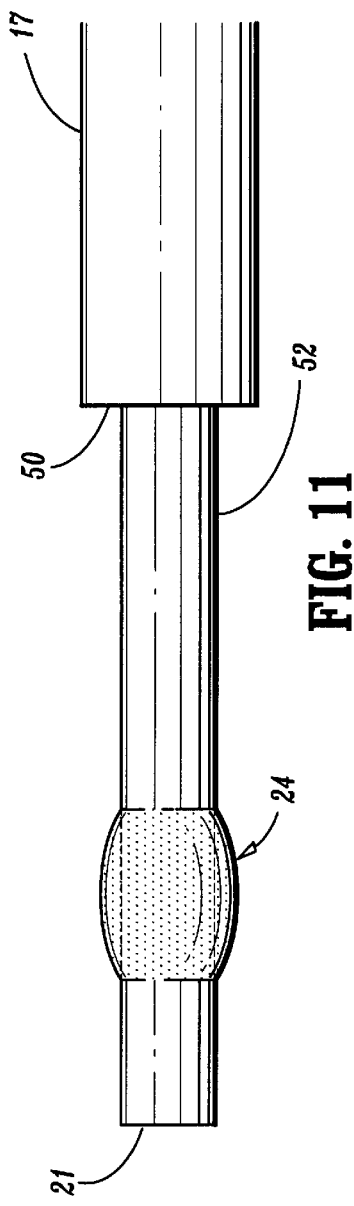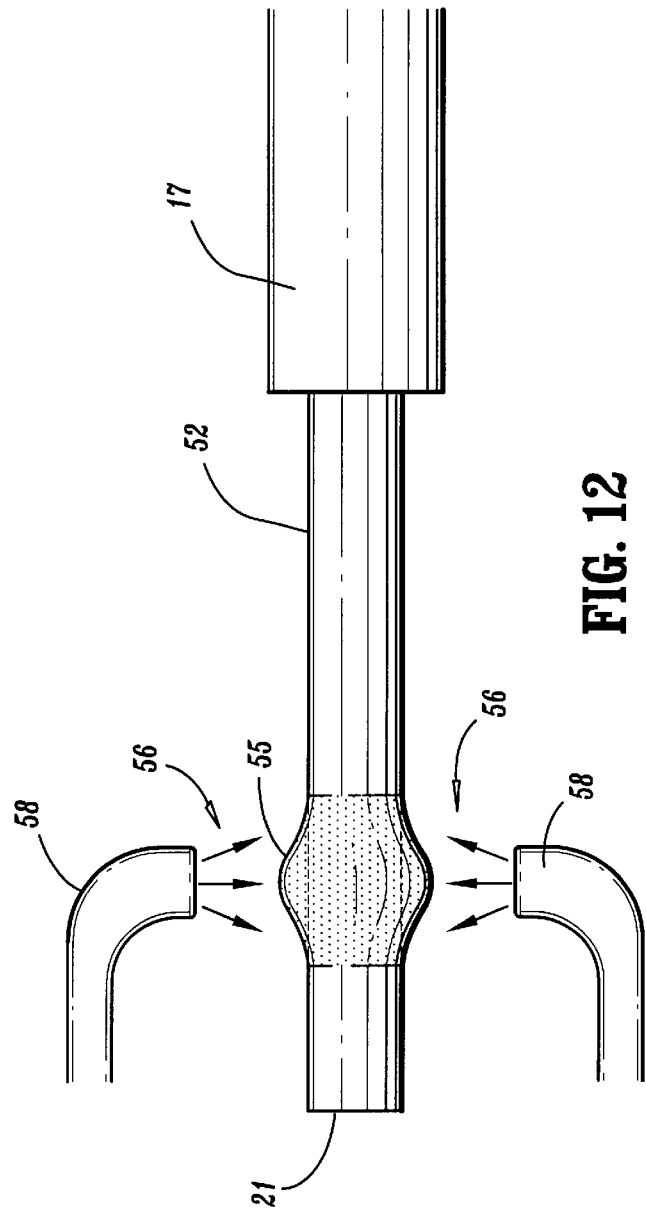

FIBER PIVOT FOR OPTICAL ALIGNMENT

BACKGROUND OF THE INVENTION

1. Field of the Invention

The present invention relates to optical fibers, and more particularly, to a system and method for positioning and aligning optical fibers by employing means for pivoting an optical fiber thereby providing accurate positioning of the fiber endface.

2. Description of the Related Art

Transmitting Optical Subassemblies (TOSA) are hardware components in a fiber optic data link disposed at the transition point from an electrical signal to an optical signal. Near the point where a fiber in the fiber optic data link approaches a laser where the electrical signal is used to create the optical signal, the fiber must be mechanically aligned and held in position. Proper alignment of a fiber's endface with an optically active portion of the laser is necessary to provide coupling of the laser light into the fiber.

Therefore, a need exists for a system and method which accurately holds optical fibers in position and aligns the fiber end for optical signal transfer or other uses.

SUMMARY OF THE INVENTION

The present disclosure provides methods and systems for positioning a fiber end of an optical fiber. A block is provided having an opening for receiving the optical fiber. The optical fiber is positioned in the opening to constrain the optical fiber in at least one direction. The optical fiber has a first portion with a free end which is cantilevered or extends from the block. The optical fiber is moved against the at least one direction which is constrained. The movement is imposed upon the optical fiber from a position on a second portion of the optical fiber, which is opposite the first portion relative to the block. This movement causes a lateral displacement of the free end.

In useful embodiments of the present disclosure, a mechanical means for holding an optical fiber in position using the combination of, for example, a v-groove to constrain the fiber in two directions and a pivot point to force a displacement (in either of two directions) on one side of the pivot point due to a displacement on the other side is disclosed.

The pivot v-groove may be located along the fiber in close proximity to the endface of the fiber. The pivot v-groove and the laser may be disposed upon a substrate. An alignment and fixing operation is preferably performed to bring and hold the endface of the fiber into mechanical proximity to the optically active portion of the laser. A system for positioning a fiber end of an optical fiber, in accordance with the present invention, includes a block having an opening for receiving the optical fiber and constraining the optical fiber in at least one direction. A reference is disposed a first distance from the block against which the optical fiber is to be aligned. A positioning system is disposed a second distance from the block on an opposite side of the block relative to the reference, and the positioning system moves the optical fiber laterally relative to the block to cause a lateral displacement of a fiber end on the side of the block where the reference is disposed such that alignment between the fiber end and the reference is achieved.

An optical subassembly, in accordance with the present invention includes a block having an opening extending in an axial direction through the block. The opening receives an optical fiber and constrains the optical fiber in at least one direction. A reference is disposed a first distance from the block. A fiber end portion of the optical fiber forms an angle relative to the axial direction of the opening such that a fiber end of the optical fiber is aligned with the reference to provide optical power transfer between the fiber end and the reference.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 8 is a perspective view showing an adhesive disposed on a fiber in a region of a v-groove to establish a mechanical link between the fiber and v-groove in accordance with the present invention;

FIG. 9 is a side view showing a buffer layer stripped off an optical fiber for use in accordance with one embodiment of the present invention;

FIG. 10 is a perspective view of the fiber of FIG. 9 showing an adhesive being applied to the fiber in accordance with the present invention;

FIG. 11 is a perspective view of the fiber of FIG. 10 showing the adhesive after being applied to the fiber in accordance with the present invention;

FIG. 12 is a perspective view of the fiber of FIG. 11 showing the adhesive being cured in accordance with the present invention;

DETAILED DESCRIPTION OF PREFERRED EMBODIMENTS

Figure 1:
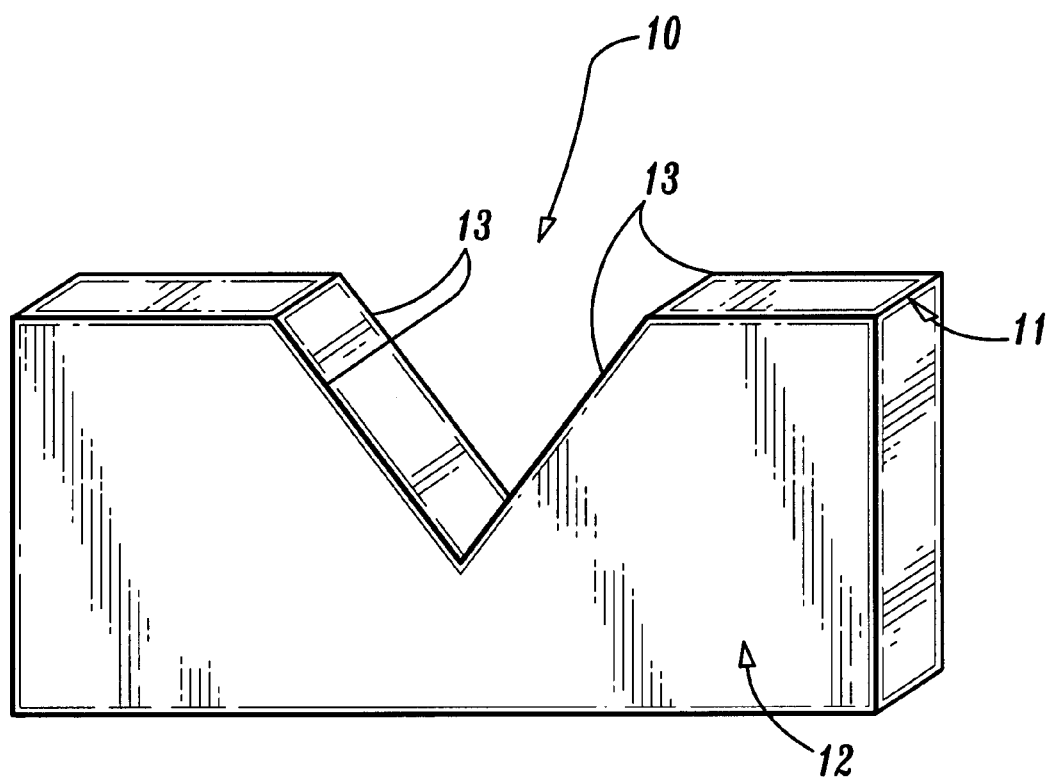
FIG. 1 is a perspective view of a v-groove adapted for use in accordance with the present invention.

The present disclosure includes a mechanical device for holding an optical fiber in position using a fiber chuck or holder to constrain the fiber preferably in two directions and provide a pivot point to force a displacement (in either of two directions) on one side of the pivot point due to a displacement on the other side. Rotation about the pivot point may be provided by permitting relative motion with respect to the block holding the fiber. Alternately, a bulbous mass may be formed on the fiber to provide a rocking motion for pivoting a fiber endface. The present invention is also directed to an optical subassembly, which includes an optical fiber aligned to a laser source, etc. in accordance with the methods of the present invention. Referring now in detail to the figures in which like numerals represent the same or similar elements and initially to FIG. 1, a v-groove block 12 is shown for holding and/or constraining an optical fiber. An opening 10 is shown in an "upward" orientation. This orientation will be employed to describe an illustrative embodiment of the present invention. It is to be understood that block 12 may include grooves or other structures etched into a substrate or an other fiber constraining structure. In the illustrative example, opening 10 includes two surfaces oriented at an angle to form a "V," hence v-groove. The v-groove block is configured to constrain a cylindrically shaped object such as an optical fiber (not shown). The cylindrically shaped fiber rests in the v-groove (a force may be applied to hold the fiber in contact with sidewalls of the v-groove).

Edge 11, for purposes of the present disclosure, is oriented in the axial direction (axial direction of the fiber) and is the axial length of the v-groove 12. The fiber (not shown) rests in opening 10. V-groove block 12 is a mechanical element into which opening 10 is formed. Block 12 may have edges 13 broken, e.g., chamfered or radiused to reduce the risk of damage to the fiber. The thickness of block 12 is preferably small. In this way, pivoting of the optical fiber is easily accomplished. The v-groove may be 1) formed from metal, for example, copper or brass, plated with metal, such as gold, or formed from other suitable materials, such as graphite, etc., 2) formed from wire (formed over a slot or v-groove in the substrate), 3) molded into a metal substrate, or 4) etched or otherwise formed into a substrate (silicon, plastic, sintered metal, glass, etc.). The length of the v-groove (the z or axial direction) in one embodiment (the v-grooved formed in copper sheet material) is about 150 microns. A preferred range of v-groove lengths is from about 5 to 250 microns for 125/250 micron diameter fiber.

Figure 2:
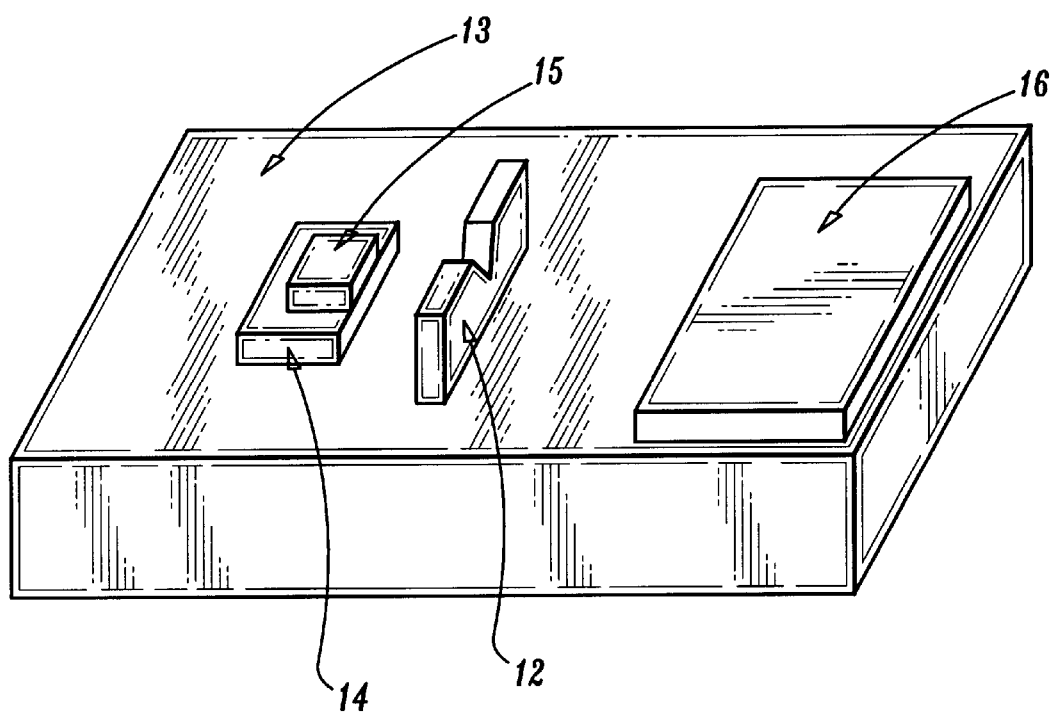
FIG. 2 is a perspective view of a v-groove block, a laser pedestal and a fiber pedestal disposed on a substrate in accordance with the present invention.

Referring to FIG. 2, in one illustrative application of the present invention, block 12 is disposed upon a substrate 13. A laser pedestal 14 is mounted on substrate 13, and a laser 15 is mounted on laser pedestal 14. A fiber pedestal 16 is a spacer/mechanical feature to which a fiber may attach to provide mechanical strain relief. Fiber pedestal 16 may include a pad or structure for contacting a fiber. (See FIG. 5).

Figure 3:
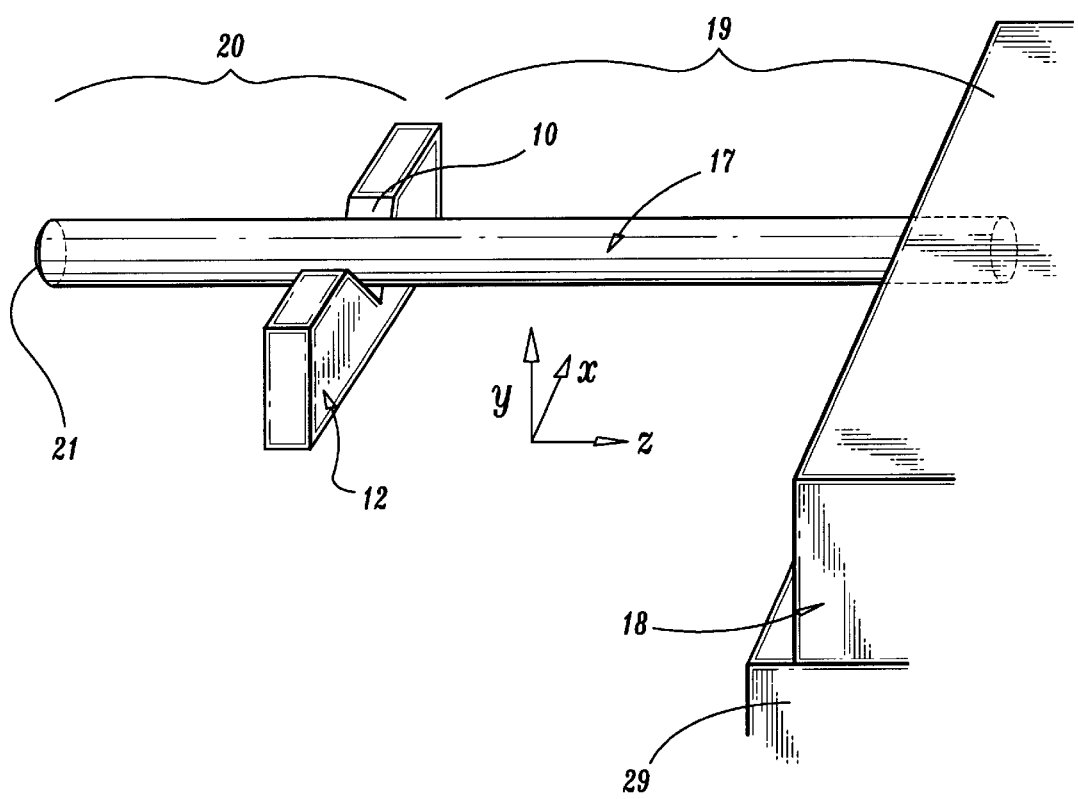
FIG. 3 is a perspective view of a v-groove block with a fiber positioned therein, the fiber being held by a holder to provide positioning of the fiber in accordance with the present invention.

Referring to FIG. 3, block 12 is shown with a fiber 17 placed within opening 10. A holder 18 grips fiber 17 and is mounted upon a multi-axis stage 29. As holder 18 moves in response to displacements made by the multi-axis stage, a controlled portion 19 of fiber 17 moves and bends. An end portion or cantilevered portion 20 of fiber 17 also moves in response to motions of holder 18. The v-groove of block 12 acts as a pivot point for transverse (X and Y) motions of holder 18.

An endface 21 of the fiber is cantilevered from the v-groove block 12. The remaining portion of the fiber (in region 19), called a controlled portion of the fiber, is mechanically held by a holder 18 which, in turn, is mounted on the multi-axis stage 29. Moving one of the axis components of the multi-axis stage moves, of course, the controlled portion 19 of the fiber. In turn, cantilevered portion 20 of fiber 17 is moved correspondingly in the opposite direction due to a pivot point created at block 12.

An axial motion (z-direction) of fiber 17, accomplished by moving a Z axis stage of the multi-axis stage, creates a motion of endface 21 (motion is substantially perpendicular to endface 21 with slight displacement in the x or y directions) of the controlled portion 19 of fiber 17. The x or y components would be small. A positive Z motion of holder 18 results primarily in a positive Z motion of the endface. A transverse motion of fiber 17, accomplished by moving an X (or Y) axis stage of the multi-axis stage, creates, primarily, an X (or Y) motion of the endface (motion parallel to endface 21, nominally) of the controlled portion 19 of the fiber 17. A positive X (or Y) motion of the holder results in a negative X (or Y) motion of endface 21. Advantageously, the present invention provides a lateral displacement of fiber 17 which enables appropriate alignment relative to a reference.

Figure 4:
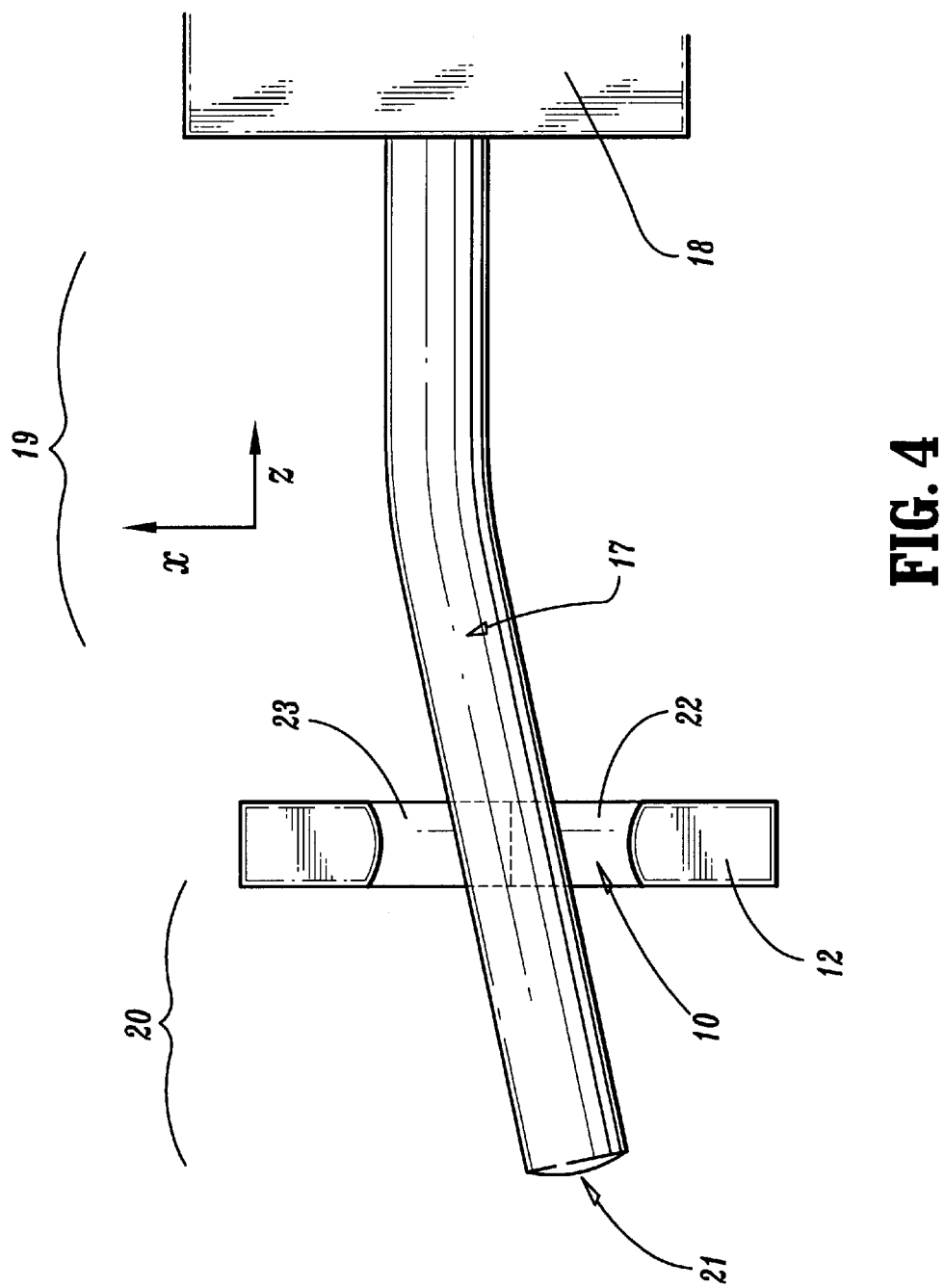
FIG. 4 is a top view of the v-groove block of FIG. 3 showing a fiber end displaced in a lateral negative x direction to illustrate the pivoting action resulting from a lateral positive x motion of a holder (18) in accordance with the present invention.

Referring to FIG. 4, a top down view of v-groove block 12 with fiber 17 disposed in opening 10 is shown. Holder 18 is in a position displaced from rectilinear alignment in the +X direction to illustrate the pivoting action resulting from a lateral positive X motion of holder 18. Cantilevered portion 20 of fiber 17 is angularly displaced from the center of v-groove opening 10. A corresponding shift in the negative X direction of endface 21 is also shown.

Controlled portion 19 is shown with an arc to illustrate how fiber 17 responds to the illustrated displacement of holder 18. Fiber 17 is in contact with portions of both sidewall 22 and sidewall 23 of the v-groove. Sidewalls 22 and 23 may be radiused or chamfered to protect fiber 17.

Figure 5:
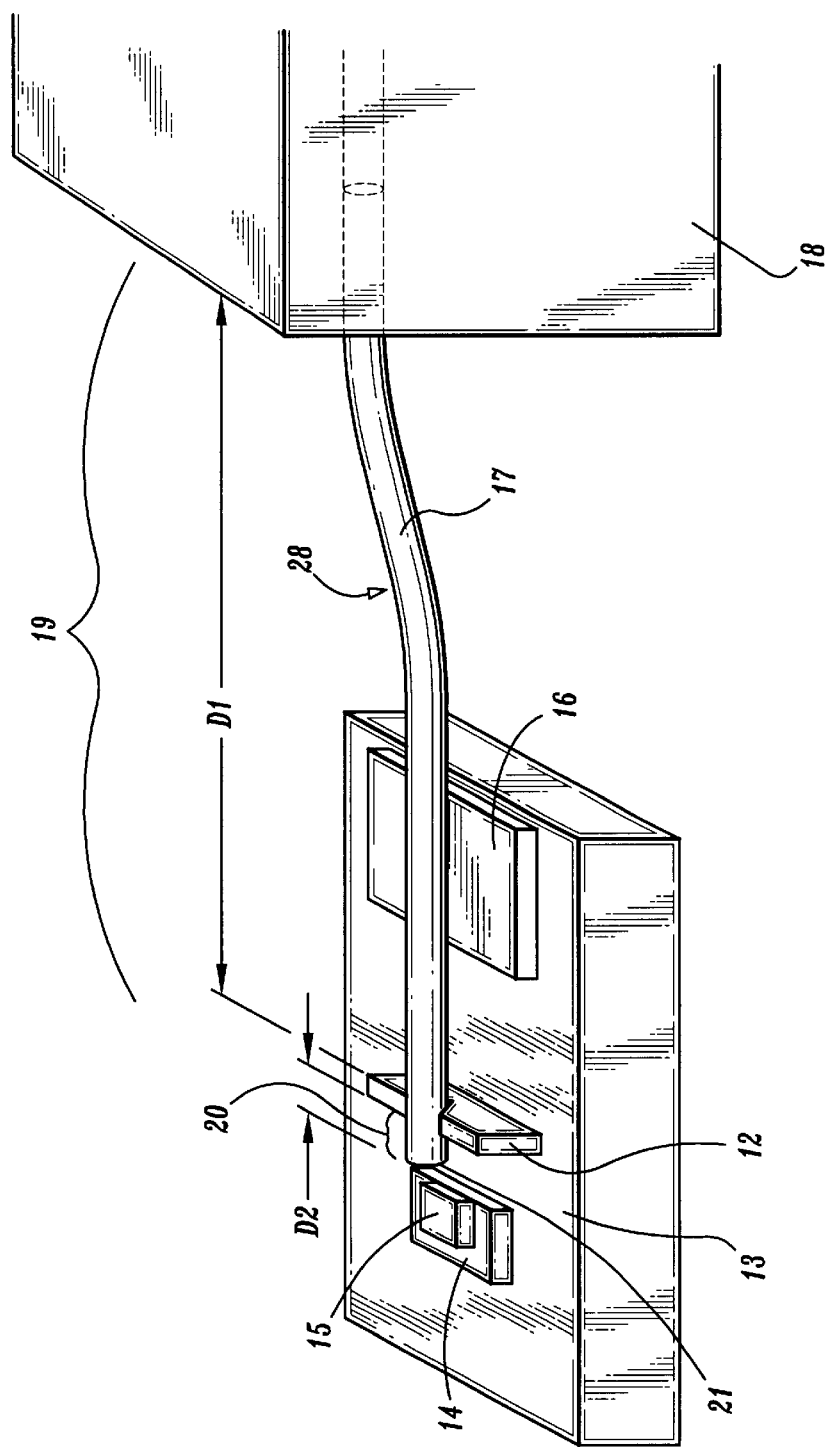
FIG. 5 is a perspective view of a substrate with a reference (e.g., laser), a fiber block, and a pad structure for aligning and holding an optical fiber in position, and a holder/stage for positioning the fiber in accordance with the present invention.

Referring to FIG. 5, a perspective view of substrate 13 with the various components, including fiber 17 in an aligned position is shown. A distance D1 from the pivot v-groove 12 to holder 18 is much larger than a distance D2 from the pivot v-groove 12 to a laser, resulting in a mechanical advantage when adjusting fiber 17 to provide appropriate alignment with laser 15. A relatively crude transverse motion of controlled portion 19 of fiber 17 creates a fine transverse motion of cantilevered or endface portion 20 of fiber 17. The present invention may provide any range of mechanical advantages, for example, mechanical advantages in the range from 2 to 20 would be particularly useful.

V-groove 12 is preferably oriented on a top of substrate 13 such that an open portion of the v-groove is open to or accessible from the top of substrate 13. The fiber 17 is brought down into the v-groove from the top of the substrate 13. The fiber is carefully positioned within a V portion of the v-groove such that intimate contact is formed between a left and a right sidewall of the v-groove simultaneously. Holder 18 may be tilted down slightly (e.g., from about 2 to about 5 degrees) toward the v-groove block 12 and the y axis stage lowered to a point where holder 18 forces controlled portion 19 of fiber 17 to form a slight arc 28, thereby applying force upon the sidewalls of the v-groove 12 by fiber 17. Subsequent x and y motions of the controlled portion 19 of fiber 17 (introduced by the multi-axis stage) cause the endface to move correspondingly without, over a useful range, driving the fiber from the v-groove.

Once positioned fiber 17 can be secured in place with an adhesive or a clamp designed to secure fiber 17 in place. In preferred embodiments, endface 21 of fiber 17 is positioned to transmit or receive optical signals to/from an optical sensor/a laser or light emitting diode.

Figure 6A:
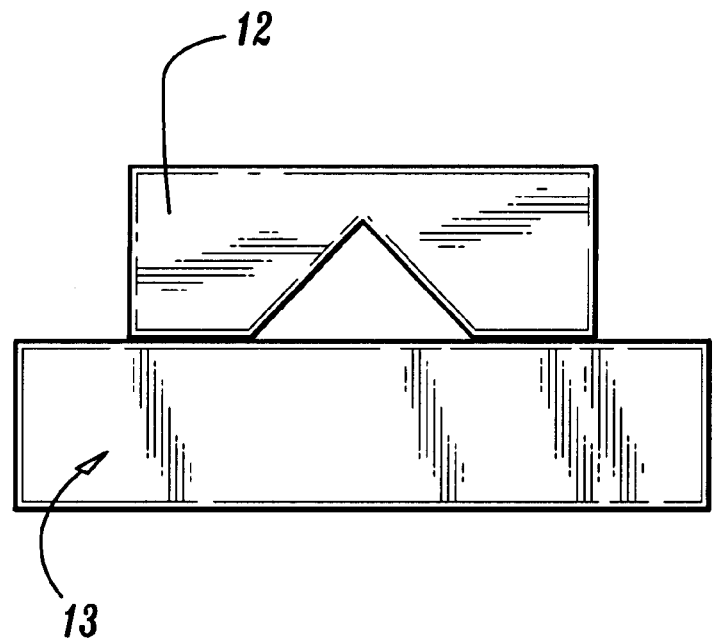
FIGS. 6A and 6B depict alternate orientations of a v-groove block on a substrate in accordance with the present invention.
Figure 6B:
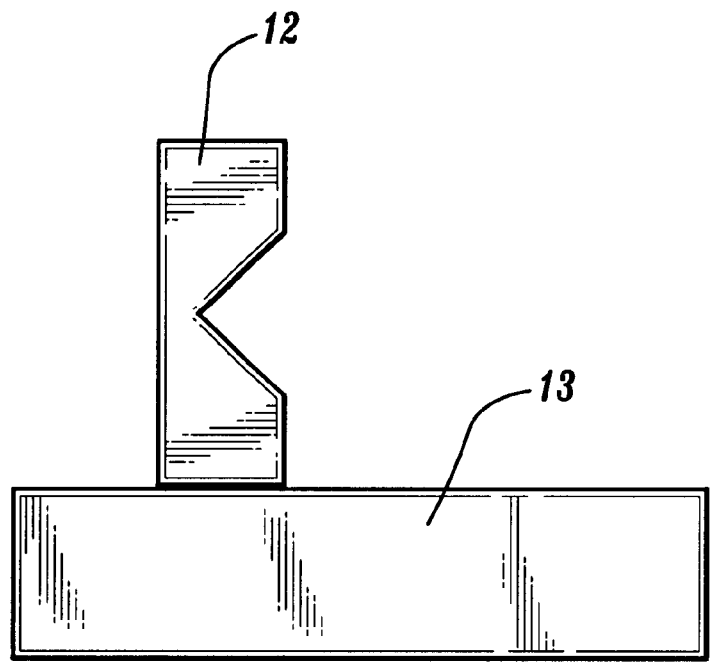
Figure 7C:
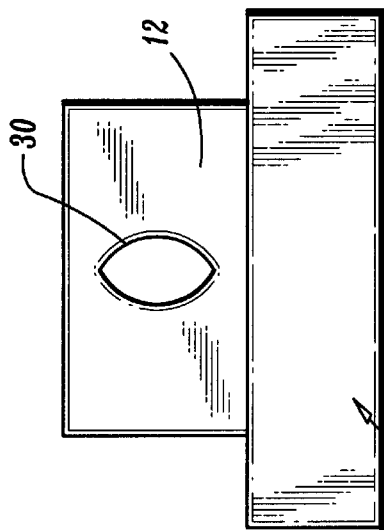
FIGS. 7A–D depict alternate fiber constraints in accordance with the present invention.
Figure 7B:
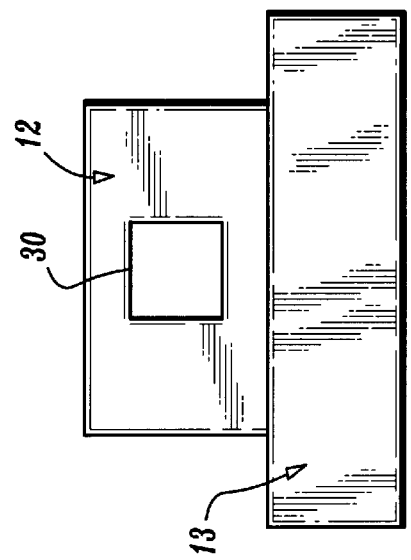
Figure 7A:
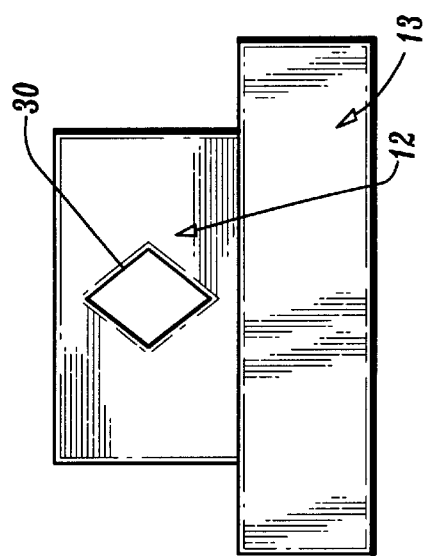
Figure 7D:
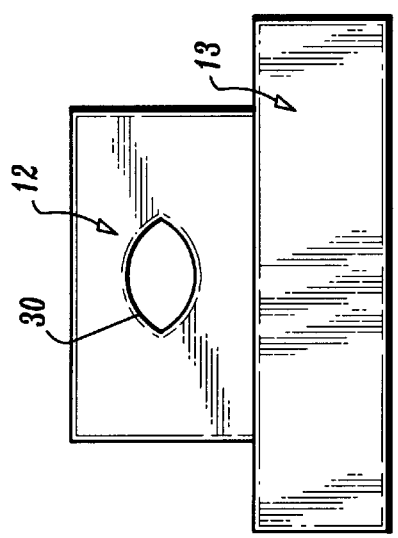

While the embodiment described above implements a v-groove oriented such that an open end of the v-groove is "up," alternatives to this structure are contemplated. As shown in FIGS. 6A and 6B, the v-groove may be oriented "down" (FIG. 6A) or sideways (FIG. 6B). Alternatively, the idea of an upward and a downward v-groove may be combined to form a feature having both upward and downward v-grooves, as shown in FIGS. 7A and 7B. Holes 30 may be employed with different shapes as shown in FIGS. 7A–7D. Other configurations may also be employed and are within the scope of the present invention. Portions of a shaped hole 30 can be used as a pivot point, as described above. In many of these alternatives, the fiber is inserted into an opening or hole 30 by moving the fiber axially through the opening 30. This is not difficult provided means are provided for setting up and observing the endface of the fiber in preparation for entering the opening.

Referring to FIG. 8, an alternate embodiment of the present invention is shown. An adhesive 24, such as an ultraviolet curable adhesive, is applied to fiber 17 to at least partially surround fiber 17. Adhesive 24 is provided such that regions of the v-groove contact fiber 17 on areas where adhesive is present. For example, adhesive 24 contacts sidewall 22 and sidewall 23 establishing a mechanical link between fiber 17 and v-groove block 12. Surface tension of a liquid adhesive helps to maintain fiber 17 in contact with surfaces 22 and 23.

Once cured, adhesive 24 locks in the position of fiber 17 relative to a laser beam (not shown), or other reference in which alignment is to be made.

In another embodiment, adhesive 24 may be cured on fiber 17 to form a bulbous mass. The bulbous mass may be employed as a contact surface with the v-groove and be used as a rocker mechanism to provide mechanical advantage during the pivoting of fiber 17. Additional adhesive 24 may be added and cured (e.g., by UV irradiation) to hold the position of the fiber once aligned.

Referring to FIGS. 9 and 10, a buffer layer 50 of optical fiber 17 may be removed from a portion of fiber 17 to expose glass 52. In one example, buffer layer 50 may be removed to, e.g., about 5 mm from end face 21.

A dispenser 54, which may include a necked down glass rod with a ball (53) on the end, a syringe or other adhesive dispensing device, is employed to apply adhesive 24 at a position near endface 21 on exposed glass 52 of fiber 17. In one example, adhesive 24 is applied at a distance of about 1 mm from endface 21. Fiber 17 may be rotated about its longitudinal axis to provide uniform wetting of glass 52 at the position of application. Adhesive material 24 remains on fiber 17 providing a local coating at the point of application, as shown in FIG. 11.

Referring to FIG. 12, adhesive material 24 is cured to form a bulbous 55 mass on fiber 17. If a UV curable adhesive is applied, UV light 56 from a UV source 58 is employed to cure adhesive 24. Since adhesive 24 is preferably a composition which does not readily wet fiber 17, adhesive 24 "balls up" to form a local, droplet of adhesive (bulbous mass 55).

Figure 13:
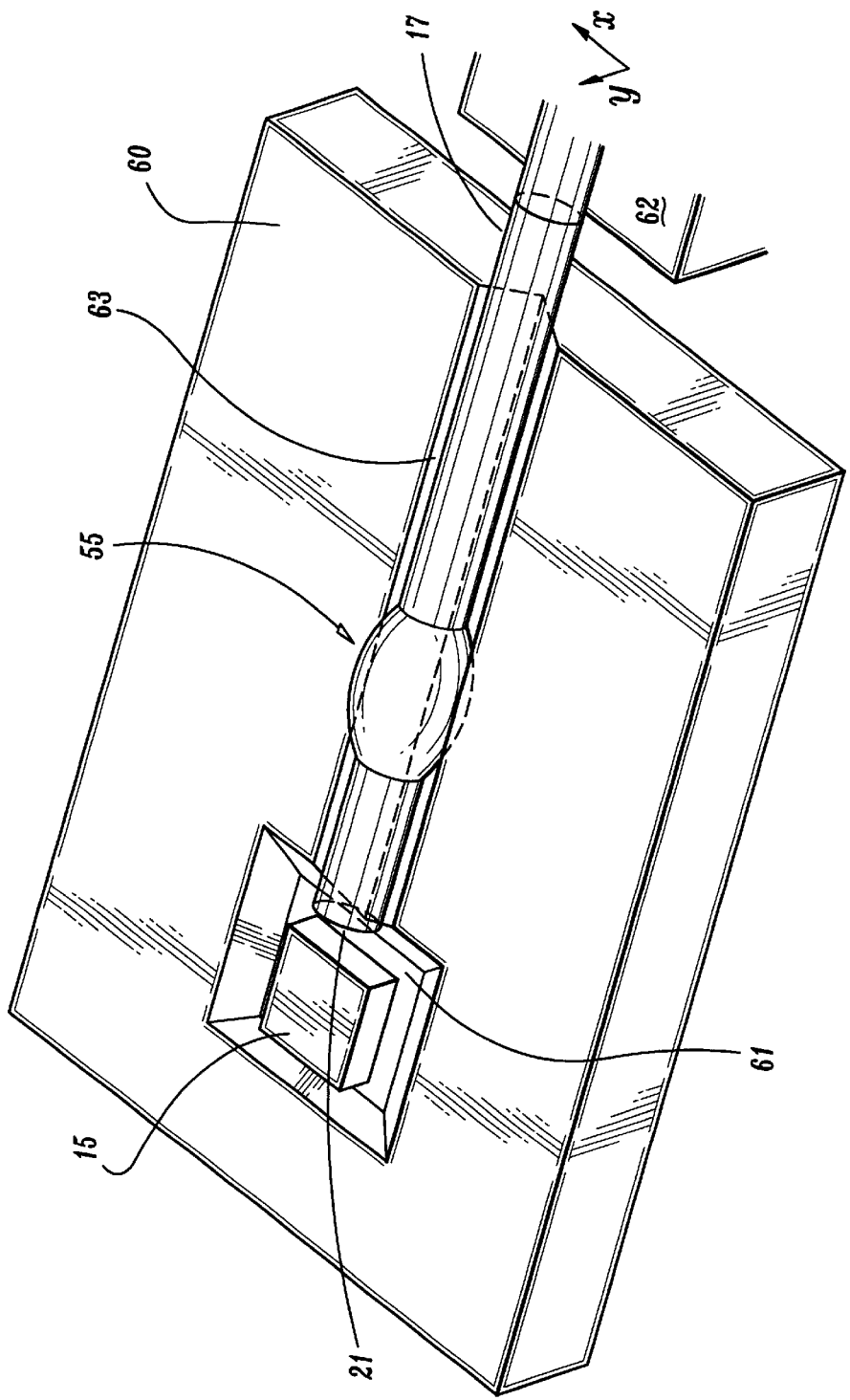
FIG. 13 is a perspective view of an alignment device showing a fiber being aligned to a laser or reference in accordance with the present invention.

Referring to FIG. 13, after mass 55 is formed, fiber 17 is positioned in a v-groove or other constraining structure 60 (see, e.g., FIGS. 6A–B and 7A–D). Structure 60 may already provide course (or fine) alignment of fiber 17 (e.g., within 50 microns of alignment of a solid state laser 15). The surface of droplet or mass 55 rests in a groove of structure 60 and contacts surfaces of the groove to provide a pivoting motion of fiber 17. By moving a portion of fiber 17 opposite from endface 21 using a positional system 62, small motions of endface 21 are achieved. These motions provide alignment of endface 21 with a laser beam from laser 15. Both X and Y motions may be achieved in this fashion. When laser 15 is activated and coupled laser power is monitored at the far end of the fiber (opposite endface 21), the alignment of the fiber endface 21 to laser 15 is readily achieved by progressively moving stages of positioning system 62 while observing optical power output. Once the desired level of alignment is achieved (i.e., desired coupled power), an adhesive or other compound can be applied to fiber 17 so that the adhesive flows over mass 55 and wicks into the groove of structure 60. After checking alignment and adjusting if necessary, the adhesive is then cured (e.g., UV cured adhesive) to hold the position of fiber 17. It should be noted that the desired coupled power may or may not include the maximum power. Alignment may be to a power of a predetermined value, e.g., compatible with receiver device specifications. In addition, tuning may be performed to achieve the desired power level.

Structure 60 may include a material compatible with glass fibers, for example, silicon or glass. Structure 60 may include an etched cavity 61 formed to receive laser 15. A groove 63 may also be etched into structure 60 to provide some alignment with laser 15. Other structures are also contemplated.

It is to be understood the present invention may be employed for a plurality of fiber optic applications. These applications may include aligning fibers to receiver or transmitter devices, aligning fibers to other fibers, aligning fibers for mechanical connections, etc. In other embodiments, mass 55 may include a split-half (clam shell) mechanical link (e.g., using lead or other materials connected to fiber 17) or a ferrule or other device which can be slipped over the fiber end 21 and positioned to provide a pivot point. Structure 60 may also include a block 12, as described above, to permit a large range of motion for fiber 17.

Figure 14:
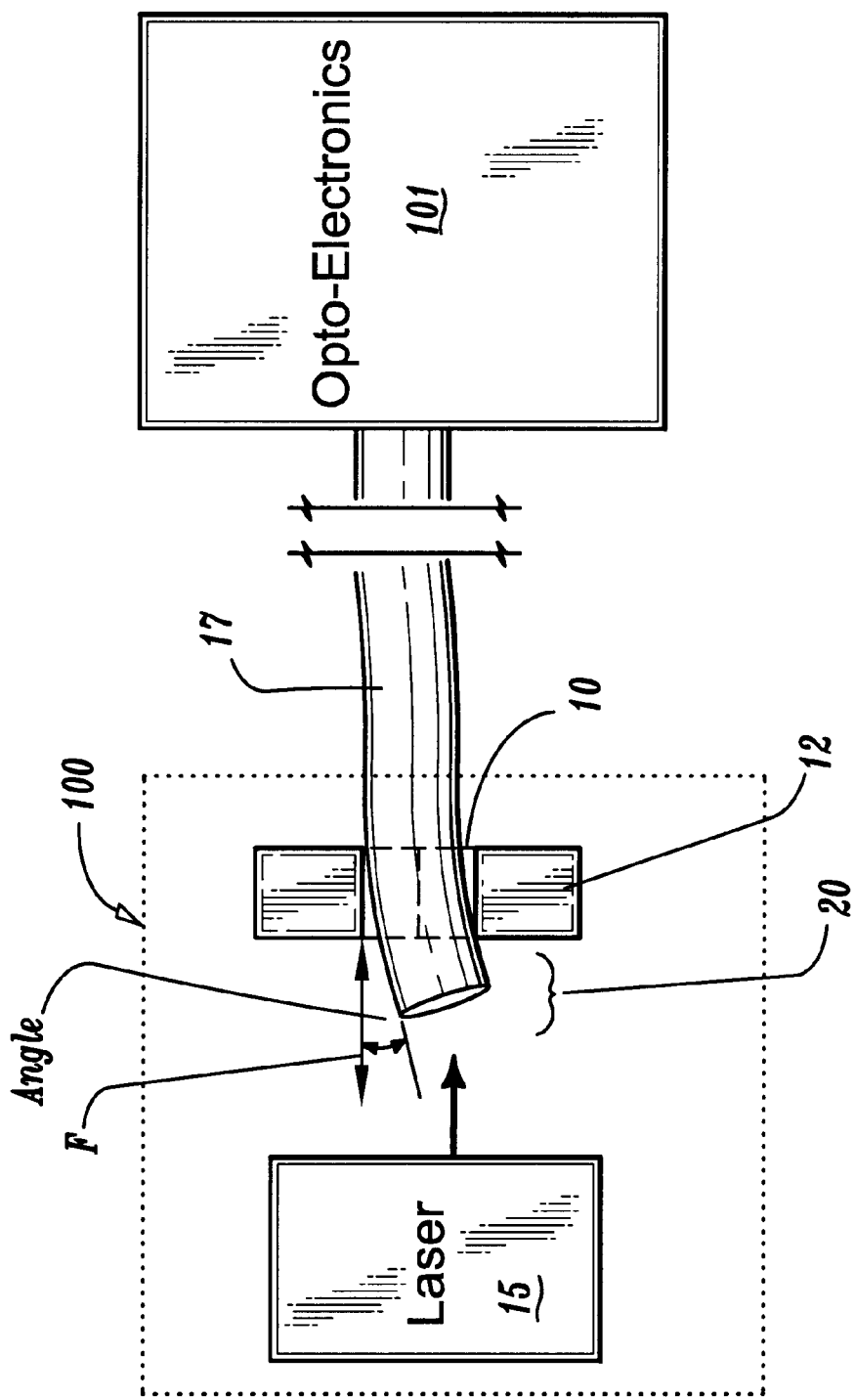
FIG. 14 is a perspective view of a portion of an optical subassembly with a fiber aligned in accordance with the present invention.

Referring to FIG. 14, an optical subassembly 100 is shown in accordance with the present invention. Optical subassembly 100 may include, for example, a transmitting optical subassembly (TOSA). A block 12 has an opening 10 extending in an axial direction through the block. The axial direction is indicated by arrow "F". Opening 10, e.g., a v-groove, receives an optical fiber 17 and constrains the optical fiber in at least one direction. A reference 15, which preferably includes a solid state laser, is disposed a first distance from block 12. A fiber end portion 20 of the optical fiber forms an angle relative to the axial direction of the opening such that a fiber end 21 of the optical fiber 17 is aligned with the reference to provide optical power transfer between the fiber end and the reference. Fiber 17 may be connected to a receiver or other opto-electronic equipment 101, which are not part of subassembly 100. The angled fiber placement is a result of the alignment process of fiber 17 in accordance with the present invention. Other portions of optical subassembly 100 may include conventional components.

Having described preferred embodiments of a fiber pivot for optical alignment (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for positioning a fiber end of an optical fiber, comprising the steps of:
   providing a block having an opening for receiving the optical fiber;
   positioning the optical fiber in the opening to constrain the optical fiber in at least one direction, the optical fiber having a first portion having a free end which is cantilevered from the block, wherein a first distance from the block to the position is greater than a second distance from the free end to the block to provide a mechanical advantage such that a displacement of the second portion causes a smaller displacement of the fiber end; and
   moving the optical fiber against the at least one constrained direction from a position on a second portion of an optical fiber, which is opposite the first portion relative to the block, to cause a lateral displacement of the free end.

2. The method as recited in claim 1, wherein the step of moving includes the step of aligning the optical fiber to a laser source.

3. The method as recited in claim 1, wherein the opening includes a v-groove and the step of moving includes the step of pivoting the optical fiber about a pivot point created by the v-groove.

4. The method as recited in claim 1, wherein the opening includes a hole through the block, the hole having converging surfaces for constraining the fiber and the step of moving includes the step of pivoting the optical fiber about a pivot point created by the hole.

5. The method as recited in claim 1, further comprising the step of providing an adhesive on the optical fiber to maintain the fiber in the opening.

6. The method as recited in claim 5, further comprising the step of curing the adhesive to secure the position of the fiber.

7. The method as recited in claim 1, wherein the mechanical advantage is in the range of about 1 to about 8.

8. The method as recited in claim 1, wherein the step of moving the optical fiber includes employing a stage to adjust the optical fiber position on the second portion.

9. A method for positioning a fiber end of an optical fiber, comprising the steps of:
   providing a block having an opening for receiving the optical fiber, the optical fiber including a bulbous mass formed thereon;
   positioning the optical fiber in the opening to constrain the optical fiber in at least one direction such that the bulbous mass contacts sides of the opening, the optical fiber having a first portion having a free end which is cantilevered from the block; and
   moving the optical fiber against the at least one constrained direction from a position on a second portion of the optical fiber, which is opposite the first portion relative to the block, to cause a lateral displacement of the free end, the bulbous mass being employed to facilitate a lateral motion of the free end.

10. The method as recited in claim 9, wherein the step of moving includes the step of aligning the optical fiber to a laser source.

11. The method as recited in claim 9, wherein the opening includes a v-groove and the step of moving includes the step of pivoting the optical fiber about a pivot point created between the bulbous mass and the v-groove.

12. The method as recited in claim 9, wherein the opening includes a hole through the block, the hole having converging surfaces for constraining the fiber and the step of moving includes the step of pivoting the optical fiber about a pivot point created between the bulbous mass and the hole.

13. The method as recited in claim 9, further comprising the step of securing the position of the fiber.

14. The method as recited in claim 9, wherein a first distance from the block to the position is greater than a second distance from the free end to the block to provide a mechanical advantage such that a displacement of the second portion causes a displacement of the fiber end.

15. The method as recited in claim 9, wherein the mechanical advantage is in the range of about 1 to about 8.

16. The method as recited in claim 9, wherein the step of moving the optical fiber includes employing a stage to adjust the optical fiber position on the second portion.

17. A system for positioning a fiber end of an optical fiber, comprising:
   a block having an opening for receiving the optical fiber and constraining the optical fiber in at least one direction;
   a reference disposed a first distance from the block against which the optical fiber is to be aligned; and
   a positioning system disposed a second distance from the block on an opposite side of the block relative to the reference, the positioning system for moving the optical fiber laterally relative to the block to cause a lateral displacement of a fiber end on the side of the block where the reference is disposed such that alignment between the fiber end and the reference is achieved.

18. The system as recited in claim 17, wherein the reference includes a laser source.

19. The system as recited in claim 17, wherein the opening includes a v-groove, the v-groove providing a pivot point to pivot the optical fiber.

20. The system as recited in claim 17, wherein the opening includes a hole through the block, the hole having converging surfaces for constraining the fiber.

21. The system as recited in claim 17, further comprising an adhesive to maintain the optical fiber in the opening.

22. The system as recited in claim 17, wherein the positioning system includes a stage to adjust the optical fiber position.

23. The system as recited in claim 17, further comprising a bulbous mass formed on an optical fiber wherein the optical fiber is placed in the opening such that the bulbous mass contacts walls of the opening, the bulbous mass being employed to facilitate a pivoting motion of the fiber.

24. The system as recited in claim 23, wherein the bulbous mass includes an adhesive.

25. The system as recited in claim 24, wherein the adhesive includes an ultraviolet curable adhesive.

26. An optical subassembly, comprising:
   a block having an opening extending in an axial direction through the block, the opening for receiving an optical fiber and constraining the optical fiber in at least one direction;
   a reference disposed a distance from the block; and
   a fiber end portion of the optical fiber forming an angle relative to the axial direction of the opening such that a fiber end of the optical fiber is aligned with the reference to provide optical power transfer between the fiber end and the reference.

27. The optical subassembly as recited in claim 26, wherein the reference includes a laser source.

28. The optical subassembly as recited in claim 26, wherein the opening includes a v-groove and the axis of the opening being defined by a line of intersection of side walls of the v-groove.

29. The optical subassembly as recited in claim 26, wherein the opening includes a hole through the block, the hole having converging surfaces for constraining the fiber.

30. The optical subassembly as recited in claim 26, further comprising an adhesive to maintain the optical fiber in the opening.

31. The optical subassembly as recited in claim 26, further comprising a bulbous mass formed on the optical fiber wherein the optical fiber is placed in the opening such that the bulbous mass contacts walls of the opening, the bulbous being employed to facilitate a pivoting motion of the fiber.

32. The optical subassembly as recited in claim 31, wherein the bulbous mass includes an adhesive.

* * * * *